United States Patent
Molinaro et al.

(10) Patent No.: US 9,122,080 B2
(45) Date of Patent: Sep. 1, 2015

(54) OPHTHALMIC LENS HOLDER FOR A CENTERING DEVICE

(71) Applicants: Andrea Molinaro, Charenton le Pont (FR); Jerome Pernot, Charenton le Pont (FR); Hughes Ameurlain, Charenton le Pont (FR); Laurent De Sadeleer, Charenton le Pont (FR)

(72) Inventors: Andrea Molinaro, Charenton le Pont (FR); Jerome Pernot, Charenton le Pont (FR); Hughes Ameurlain, Charenton le Pont (FR); Laurent De Sadeleer, Charenton le Pont (FR)

(73) Assignee: ESSILOR INTERNATIONAL (COMPAGNIE GENERALE D'OPTIQUE), Charenton le pont (FR)

( * ) Notice: Subject to any disclaimer, the term of this patent is extended or adjusted under 35 U.S.C. 154(b) by 0 days.

(21) Appl. No.: 14/360,731

(22) PCT Filed: Nov. 20, 2012

(86) PCT No.: PCT/FR2012/000472
§ 371 (c)(1),
(2) Date: May 27, 2014

(87) PCT Pub. No.: WO2013/079822
PCT Pub. Date: Jun. 6, 2013

(65) Prior Publication Data
US 2014/0368813 A1     Dec. 18, 2014

(30) Foreign Application Priority Data
Nov. 29, 2011   (FR) ...................................... 11 03634

(51) Int. Cl.
*G01B 9/00*     (2006.01)
*G02C 13/00*    (2006.01)
*B24B 13/005*   (2006.01)
*B24B 9/14*     (2006.01)

(52) U.S. Cl.
CPC .............. *G02C 13/003* (2013.01); *B24B 9/146* (2013.01); *B24B 13/005* (2013.01); *B24B 13/0055* (2013.01); *G02C 13/001* (2013.01); *G02C 13/005* (2013.01)

(58) Field of Classification Search
CPC .. G02C 13/005; G02C 13/001; B24B 13/005; G01B 9/00
USPC ......................................................... 356/127
See application file for complete search history.

(56) References Cited

U.S. PATENT DOCUMENTS

| 1,134,938 | A | 4/1915 | Bader et al. |
| D442,388 | S * | 5/2001 | Zuercher ........................ D6/684 |
| 7,527,377 | B2 | 5/2009 | Divo |

(Continued)

FOREIGN PATENT DOCUMENTS

| EP | 1 842 622 | 10/2007 |
| FR | 2 866 719 | 8/2005 |
| JP | 2005 316435 | 11/2005 |

OTHER PUBLICATIONS

International Search Report dated Mar. 8, 2013, corresponding to PCT/FR2012/000472.

*Primary Examiner* — Roy M Punnoose
(74) *Attorney, Agent, or Firm* — Young & Thompson

(57) ABSTRACT

An ophthalmic lens holder (1), includes a pedestal (10) and at least three contact pads (30) that rise from the pedestal such as to have substantially coplanar free ends (31), whereby the contact pads are suitable for bearing the ophthalmic lens. The holder has at least three through-openings (25) of axes (A1) substantially orthogonal to the plane of the free ends of the three contact pads.

10 Claims, 3 Drawing Sheets

(56) References Cited

U.S. PATENT DOCUMENTS

| | | | |
|---|---|---|---|
| 7,641,160 B2* | 1/2010 | Coleman | 248/188.91 |
| 7,937,826 B2 | 5/2011 | Matsuyama | |
| 8,250,723 B2* | 8/2012 | Kasha | 29/407.09 |
| 2004/0065791 A1* | 4/2004 | Coleman | 248/176.1 |
| 2007/0177101 A1 | 8/2007 | Divo | |
| 2007/0226991 A1 | 10/2007 | Matsuyama | |
| 2011/0000066 A1* | 1/2011 | Kasha | 29/428 |
| 2013/0235370 A1* | 9/2013 | Boutinon et al. | 356/124 |
| 2014/0038500 A1* | 2/2014 | Brechemier et al. | 451/390 |

* cited by examiner

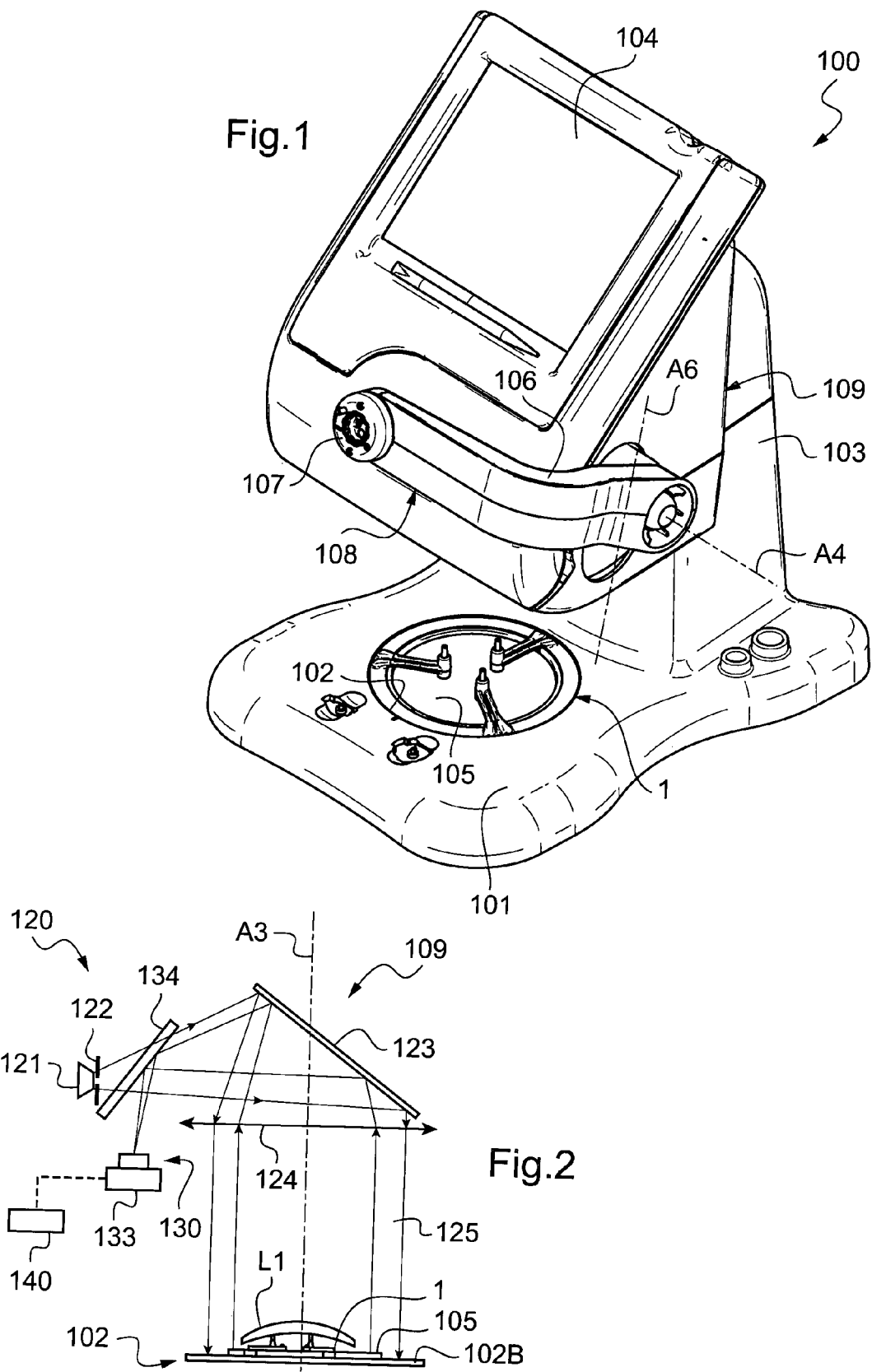

OPHTHALMIC LENS HOLDER FOR A CENTERING DEVICE

TECHNICAL FIELD OF THE INVENTION

Generally, the present invention relates to the centering of ophthalmic lenses, with a view to trimming them and mounting them in spectacle frames.

The invention more particularly relates to an ophthalmic lens holder for a centering device, comprising a stand and at least three pads that rise up from the stand to present substantially coplanar free ends, via which the pads are designed to bear the ophthalmic lens.

The invention also relates to a device for centering an ophthalmic lens and a method for calibrating such a centering device.

PRIOR ART

The technical part of the work of an optician consists in mounting a pair of ophthalmic lenses in a spectacle frame selected by a customer. This mounting operation can be divided into three main operations:
  acquiring the desired shape of the lenses, which consists in probing the bottom of the bezel of each of the two rims of the spectacle frame if the frame is a full-rimmed frame, or in probing the edge face of presentation lenses if the frame is a half-rimmed or rimless frame;
  centering each lens, which consists in determining the position that each lens will occupy in the frame in order to suitably center each lens opposite the pupil of an eye of the spectacle wearer so that each lens will suitably exercise the optical function for which it was designed; and
  trimming each lens, which consists in machining or cutting its outline to the desired shape, taking into account set centering parameters.

In the context of the present invention, it is the second operation, i.e. the "centering" operation, that is more particularly of interest.

In point of fact, it is a question, for the optician, of defining the position that the desired outline, along which the lens must be trimmed, must occupy relative to the optical frame of reference of the lens (typically indicated by conventional marks), so that, when the pair of spectacles is borne by the spectacle wearer, the lens is suitably positioned in the axle of the pupil of an eye of the wearer.

To do this, the optician places the lens to be centered on a holder such as defined in the introduction, so as to allow the centering device to locate the positions of marks painted on or etched into the lens and to deduce therefrom the position of the optical center point of the lens to be positioned opposite the pupil of one of the eyes of the spectacle wearer.

The Applicant has observed that, once the ophthalmic lenses have been trimmed, and despite the care taken when producing and assembling the structural and optical elements of the centering device, the lenses may not be correctly centered on the axis of the eyes of the wearer, which may lead to the latter experiencing visual discomfort.

SUBJECT OF THE INVENTION

In order to remedy the aforementioned drawback of the prior art, the present invention provides a lens holder designed to allow the centering device to be regularly and automatically calibrated.

More particularly, an ophthalmic lens holder such as defined in the introduction is provided according to the invention, in which provision is made for at least three through-apertures having axes substantially orthogonal to the plane of the free ends of the three pads, which through-apertures emerge freely onto the front and back of the holder in order to be locatable by the centering device.

The expression "emerge freely onto the front and back of the holder" is understood to mean that the emerging apertures are not obscured by the rest of the holder, such that light can pass from one side of the holder to the other through these through-apertures.

The Applicant has observed, in the course of their research work, that the shapes and positions of the components of the centering device vary, especially because of wear and various shocks that they receive, or even because of temperature variations. The variation over time of the shapes and positions of these components leads to a decrease in the precision of the centering of the lens.

So, by virtue of the invention, the holder is designed to allow the centering device to carry out regularly and with no particular artifice a calibration of its various components, in order especially to make it possible to alert the optician when the precision of the centering device is no longer high enough.

Specifically, after the acquiring means have acquired an image of the empty holder (i.e. between two lens centering operations), the processing means may detect the precise positions of the through-apertures in the holder and deduce therefrom the current position of the latter in order to compare it to the initial position. Thus, the processing means may measure the discrepancy between these two positions and deduce therefrom a drift coefficient relating to variations in the shapes and positions of the components of the centering device.

The following are other advantageous and nonlimiting features of the holder according to the invention:
  the stand comprises three arms that are connected to one another via a base and that each bear one of said pads;
  said through-apertures are distributed over at least two of the three arms;
  at least one through-aperture is provided in each arm;
  the three arms are fixed relative to the base;
  at least one of the three arms is mounted so as to be able to move translatably on the base, along an axis parallel to the plane of the free ends of the three pads.

The invention also relates to a centering device comprising:
  a platen accepting a holder such as above;
  illuminating means that are able to illuminate the ophthalmic lens borne by the holder;
  acquiring means that are able to acquire an image of the ophthalmic lens borne by the holder; and
  processing means that are able to deduce from the image acquired by the acquiring means, on the one hand, the position of the ophthalmic lens, and on the other hand, the position of the through-apertures in the holder.

Preferably, the illuminating means and the acquiring means are located on the same side of the holder, and a reflector is provided on the other side of the support.

Also advantageously, the platen has, recessed into its front face, an annular groove, and the stand of the holder comprises an annular base engaged in said annular groove in such a way that the holder is able to rotate on the platen about an axis parallel to the axes of the through-apertures.

The invention also relates to a method for calibrating such a centering device, in which provision is made for:
  a prior step of acquiring an initial position of the holder;
  a step of acquiring an image of the empty holder;

a step of processing images in order to locate the positions of the through-apertures in the holder in the acquired image and in order to deduce therefrom a current position of the holder;

a step of comparing the initial position and the current position of the holder; and a step of deducing, depending on the result of this comparison, a drift coefficient relating to variations in the shapes and positions of the components of the centering device.

DETAILED DESCRIPTION OF AN EXAMPLE EMBODIMENT

The following description, given with regard to the appended drawings, by way of nonlimiting example, will allow what the invention consists of and how it can be carried out to be understood.

In the appended drawings:

FIG. 1 is a schematic perspective view of a centering/blocking apparatus equipped with a holder according to the invention;

FIG. 2 is a schematic view of centering means of the centering/blocking apparatus in FIG. 1;

FIG. 1 shows a centering/blocking apparatus 100.

Figure 3:
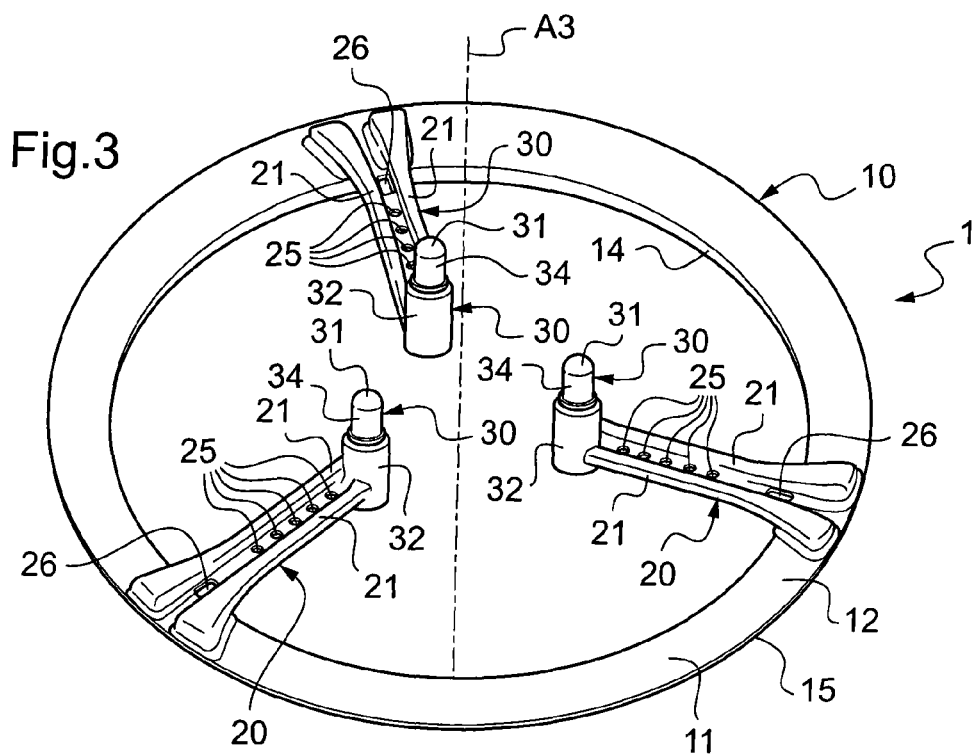
FIGS. 3 and 4 are a schematic perspective and plane view of the holder in FIG. 1.

Such an apparatus is generally used by an optician after he/she has acquired the shapes of the outlines of the rims of a spectacle frame selected by one of their customers.

This apparatus is then used to carry out operations for centering and blocking an ophthalmic lens to be mounted in this spectacle frame.

The objective of the centering operation is to locate the frame of reference of the ophthalmic lens, and to determine the position that the outline of the frame must occupy in this frame of reference so that the lens, once trimmed along this outline then mounted in the spectacle frame, is suitably centered opposite the corresponding eye of the individual.

The objective of the blocking operation is to place an accessory (called the "blocking accessory") on the ophthalmic lens, thereby, on the one hand, making it easier to pick up the lens in order to transport it from the centering/blocking apparatus 100 to a trimming apparatus, and on the other hand, providing a stable coordinate system allowing the position of the frame of reference of the lens to be located after it has been transported.

For this purpose, the centering/blocking apparatus 100 comprises:

a chassis 103;

a workstation 101 fixed to the chassis 103 in a horizontal plane;

a display screen 104 fixed to the chassis 103 and oriented so that it may be seen by an optician working at the workstation 101;

means 109 for centering the lens, said means 109 being fixed to the chassis 103; and blocking means 108 that are movably mounted on the chassis 103.

The workstation 101 has a central circular aperture 102 for loading an ophthalmic lens.

The back of this central aperture 102 is plugged by a bearing platen 105 that is transparent and flat, and on which a holder 1 of an ophthalmic lens L1 rests, which holder here more precisely forms the subject of the present invention and is described in detail below in the description.

As for the blocking means 108, they comprise a maneuvring arm 106 the free end of which forms an end-fitting 107 suitable for holding a blocking member (not shown) and to place said member in a set location on the front face of an ophthalmic lens.

This maneuvring arm 106 is here maneuvered manually. However, it is guided in such a way that its end-fitting 107 is only able to move along a preset path. For this purpose, it has only two degrees of mobility relative to the chassis 103, namely:

a degree of rotational mobility about a horizontal axis A4, in order to pivot between a loading position in which its end-fitting 107 is turned toward the optician who may then easily install a blocking member thereon, and an intermediate position in which the blocking member fixed to the end-fastening 107 is located above the ophthalmic lens placed on the holder 1, at a distance away from the latter; and a degree of translational mobility along a vertical axis A6, in order to move translationally between said intermediate position and a final position in which the blocking member bears against the front face of the ophthalmic lens placed on the holder 1.

As one variant, provision could be made for the blocking arm to be semi-automated by motorizing each of these two degrees of mobility.

As another variant, provision could also be made for the blocking arm to be automated, in which case it would have a larger number of degrees of mobility in order to allow it to place the blocking member in a desired position on the front face of the ophthalmic lens, with a desired orientation.

As for the means 109 for centering the ophthalmic lens, they are designed to determine the position of the frame of reference of the ophthalmic lens, by identifying the position and the orientation of various centering marks painted on or etched into the front face of the ophthalmic lens.

As FIG. 2 shows, these centering means 109 comprise means 120 for illuminating the ophthalmic lens L1, means 130 for acquiring an image of the ophthalmic lens L1 illuminated by the illuminating means 120, and processing means 140 for analyzing the acquired image.

In the preferred embodiment of the invention, the illuminating means 120 and the acquiring means 130 are located on one and the same side of the loading zone 102.

A reflector 102B is then installed on the other side of the loading zone 102, under the bearing platen 105, in order to reflect the light. Here, this reflector 102B is formed by a fixed mirror. It could also be formed by a mirror mounted so as to be able to move rotatably about an axis A3 parallel to the light beam illuminating the lens, in such a way that its granularity does not decrease the precision of the measurements.

The illuminating means 120 here comprise an area light source 121 that is converted to a point light source using a perforated plate 122, which emits a divergent light beam. They also comprise a mirror 123 inclined at 45°, which reflects this divergent light beam and allows the bulk of the assembly to be decreased, and a convergent lens 124 suitable for sending a light flux 125 of parallel rays in the direction of the holder 1.

As for the acquiring means 130, they comprise, in addition to the mirror 123, a half-silvered mirror 134 inclined at 45°, and a digital video camera 133 for acquiring the image. The half-silvered mirror 134, placed in front of the light source, allows some of the light to be transmitted toward the lens and allows the image of the lens to be partially reflected toward the digital video camera 133. Thus, the video camera is suitable for acquiring an image of the ophthalmic lens L1 and of the holder 100, in which image the centering marks of the lens especially appear.

Figure 4:
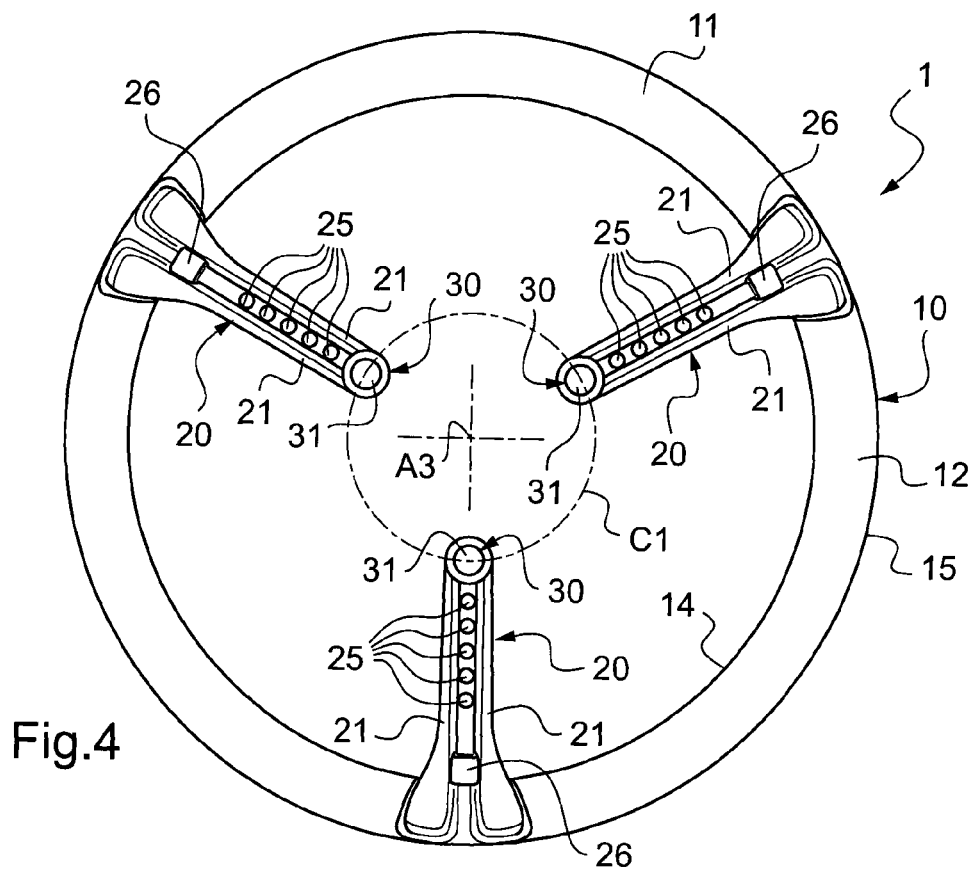

FIGS. 3 and 4 show, at two different angles, the holder 1 that more precisely forms the subject matter of the present invention.

This holder 1 comprises three pads 30 that rise up relative to one another like a tripod, in order to present tips 31 via which the pads are designed to bear the ophthalmic lens L1. It also comprises a stand 10 that allows the three pads 30 to be held in a fixed position when the latter are holding a lens.

Figure 5:
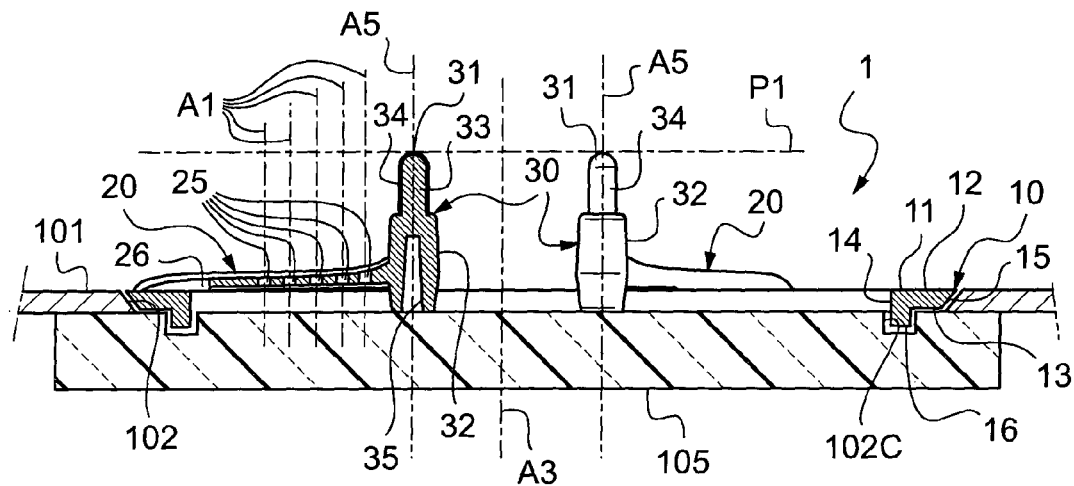
FIG. 5 is a schematic cross-sectional view of the holder in FIG. 1 and of the platen on which it rests.

As FIG. 5 clearly shows, and according to a particularly advantageous feature of the invention, the holder 1 then has at least three through-apertures 25 having axes A1 that are parallel and substantially orthogonal to the plane P1 coincident with the tips 31 of the pads 30.

By virtue of their orientation, these through-apertures 25 are visible in each image acquired by the acquiring means 130 of the centering/blocking apparatus 100. Thus, as will be described in detail below in the description, the centering/blocking apparatus 100 may regularly check that it is correctly calibrated.

More precisely, in the embodiment of the invention shown in FIGS. 3 to 5, the stand 10 of the holder 1 comprises an annular base 11 and three arms 20 that each bear one of the pads 30.

The annular base 11 is axisymmetric about the axis A3.

As FIG. 5 clearly shows, the annular base 11 has a cross section of flattened shape so that it thus has a flat top face 12, a flat bottom face 13, a cylindrical inner edge 14, and a conical outer edge 15.

It is moreover provided with means for retaining this annular base 11 in the bearing platen 105, allowing the holder 1 to be kept in the field of the digital video camera 33.

Here, these retaining means make use of interfitting shapes.

In the present case, they comprise, protruding from the back face 13 of the annular base 11, a circular rib 16 that runs along the inner edge 14 of the annular base 11 and that has a square cross section.

They also comprise, recessed into the center of the top face of the bearing platen 105, a circular groove 102C of identical diameter to that of the circular rib 16 and of square cross section.

The cross section of this circular groove 102C has identical dimensions, allowing for play, to those of the cross section of the circular rib 16. In this way, when the circular rib 16 of the annular base 11 is engaged in the circular groove 102C of the bearing platen 105, the holder 1 is held in a fixed position on the platen 105 while having an orientation that can be adjusted about the axis A3.

By virtue of this single degree of mobility, the user may, when a lens is placed on the holder 1, orient the holder 1 as desired on the bearing platen 105, in order for example to take account of the orientation of the cylinder axis of the lens.

As FIGS. 3 and 4 show, the three arms 20 are identical in shape.

They each extend radially from the annular base 11 toward the center of said base, and are regularly distributed around the annular base 11 with an angular spacing of 120 degrees relative to each other.

As FIG. 5 shows, the arms 20 more precisely extend from the top face 12 of the annular base 11, in continuation thereof. In this way, the arms 20 are located a distance away from the top face of the bearing platen 105, thereby allowing rubbing to be reduced when the user wishes to adjust the orientation of the holder 1 about the axis A3.

These arms 20 extend lengthwise over a distance smaller than the radius of the annular base 11, so that their free ends lie a distance from one another. The free ends of the arms 20 are here inscribed in a circle C1 of diameter equal to 30 millimeters (FIG. 4).

The arms 20 have flattened cross sections that are rectangular on the whole, the arms 20 being reinforced on their top faces by two lateral ribs 21 that extend lengthways from one to the other of their ends.

As FIG. 5 clearly shows, each pad 30 is axisymmetric about an axis A5 parallel to the axis A3.

More precisely, each pad 30 has a frustoconical back portion 32 that narrows slightly with distance from the back, and a cylindrical front portion 33 the top end of which is rounded.

The front portion 33 of each pad 30 is here covered with a rubber cap 34 making it possible to prevent the ophthalmic lens L1 from being scratched.

The back portion 32 of each pad 30 is connected, via its lateral face, to the corresponding arm 20. This back portion 32 moreover has, recessed into its back face, a cavity 35 that may optionally house a roller in order to make it easier for the user to adjust the orientation of the holder 1 on the bearing platen 105.

Here, the front and back portions of the pads 30, the arms 20 and the annular base 11 of the holder 1 form a single integral part produced by moulding a plastic or a metal.

Such as shown in the figures, the through-apertures 25 provided in the holder 1 are located in the arms 20 of the latter.

The through-apertures 25 are then advantageously distributed over at least two of the three arms 20, and even preferably distributed over all three arms 20.

In the present case, five through-apertures 25 are provided through each arm 20, these apertures 25 being regularly spaced pairwise along the longitudinal axis of each arm 20.

Here, these through-apertures 25 are larger than 1 millimeter in diameter, in order to be detectable in the images acquired by the digital video camera 33 (taking into account the resolution of this camera and the magnification of the centering means).

These through-apertures 25 are moreover smaller than 2 millimeters in diameter, so that their position may be measured with precision (also taking into account the resolution of this camera and the magnification of the centering means).

Provision is also made here, in order to make it easier to demold the holder 1, for a sixth aperture 26 in each arm 20, which aperture 26 is located next to the inner edge 14 of the annular base 11.

By virtue of the through-apertures 25 provided in the holder 1, the centering/blocking apparatus 100 may regularly self-calibrate in the following way.

Beforehand, in the factory or while the centering/blocking apparatus 100 is undergoing maintenance by a specialist technician, the centering means 109 of the centering/blocking apparatus 100 are optically aligned in order to make it possible for the apparatus to carry out precise measurements.

After this operation, the acquiring means 130 acquires an image of the empty holder 1, i.e. an image of the holder 1 when there is no ophthalmic lens placed thereon.

Next, the image is processed so as to locate the positions of the centers of the fifteen through-apertures 25, and to deduce therefrom the initial position $P_{to}$ of the center of the holder 1.

Regularly thereafter, for example each time the centering/blocking apparatus 100 is turned on or used, provision is made for a new image of the empty holder 1 to be acquired in order to deduce therefrom the new position $P_t$ of the center of the holder 1.

Next, this new position $P_t$ of the center of the holder 1 is compared with the initial position $P_{t0}$. The discrepancy measured between these two positions thus allows any shift in one of the components of the centering means 109 or any modification of the shape of one of these components to be detected.

Next, above a threshold discrepancy, the processing means 140 are programmed to alert the user via the screen 104, by displaying an alarm message telling him/her that the centering/blocking apparatus 100 is out of tolerance and that its components must be reset by a specialist technician.

As a variant, provision will possibly be made for the processing means 140 to monitor the variation of the measured discrepancy, especially in order to check that this variation is uniform. Provision will then possibly be made, if this variation is nonuniform, to alert the user by displaying an alarm message on the screen 104, in order to notify them of the presence of a problem.

The processing means 140 will possibly also, by analyzing this variation, calculate the amount of time remaining before the measured discrepancy exceeds the discrepancy threshold, especially in order to make it possible to alert the technician in advance.

Provision may also be made, when each ophthalmic lens is being centered, for the processing means 140 to take the measured discrepancy into account in order to make corresponding corrections to the measurements taken.

Figure 6:
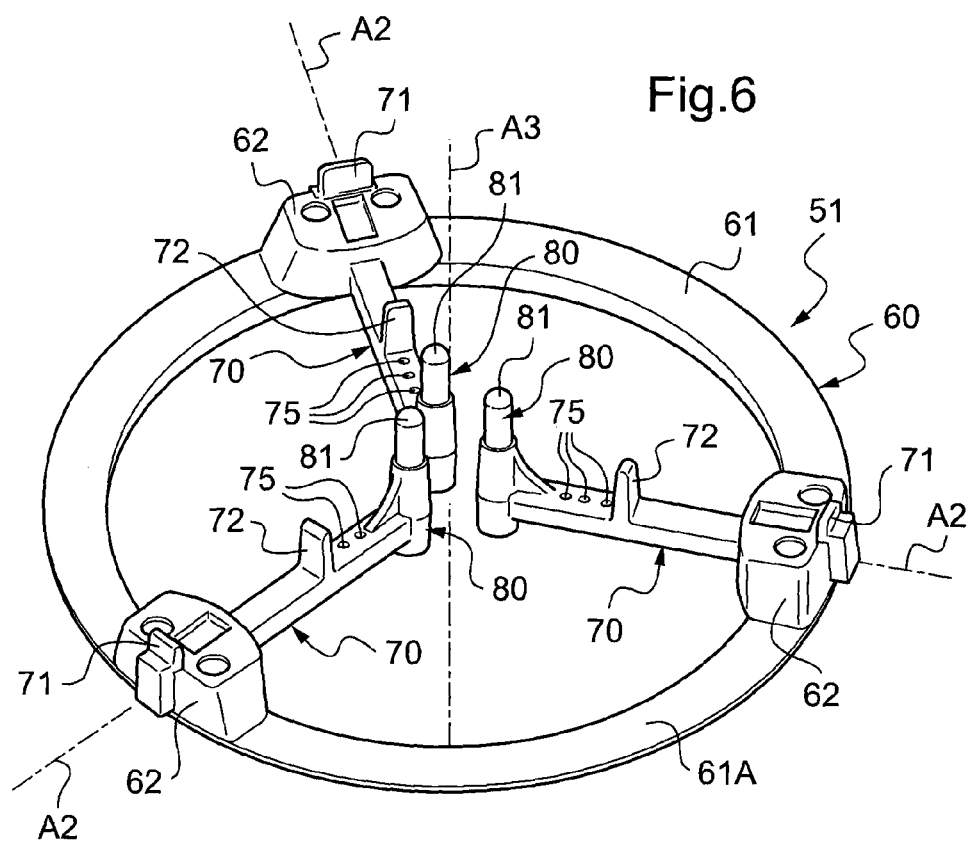
FIG. 6 is a schematic perspective view of a variant embodiment of the holder in FIG. 1.

FIG. 6 shows a variant embodiment of the holder 51 according to the invention.

In this variant, the holder 51 comprises three pads 80 that are identical to the pads 30 described above, that together form a tripod and that have tips 81 via which the pads 80 are designed to bear the ophthalmic lens.

The holder 51 also comprises a stand 60 comprising an annular base 61 and three arms 70 that each bear one of the pads 80.

In contrast to the holder 1 shown in FIGS. 2 to 5, in this variant the arms 70 of the holder 51 are mounted so as to be free to move translationally over the annular base 61, along axes A2 that are radial relative to the axis A3.

For this purpose, the annular base 61 comprises a body 61A of similar shape to that of the annular base 11 described above, and three protuberances 62 that protrude from the top face of its body, these protuberances 62 being angularly spaced relative to each other by 120 degrees.

These three protuberances 62 define, with the top face of the body 61A of the annular base 61, three through-passages of axes A2. Each of these three through-passages is profiled along its axis A2 and has a rectangular cross section.

As for the three arms 70, they are identical in shape.

Each of these three arms 70 is elongate along its axis A2 and has a rectangular cross section of equal size (allowing for play) to that of the cross section of the corresponding through-passage provided in the annular base 61.

Each arm 70 is thus free to move translationally in the corresponding through-passage provided in the annular base 61.

Each arm 70 has an outer end that emerges from the through-passage on the outside of the annular base 61, and an opposite inner end.

Each arm 70 then has, on its outer end, a tab 71 that protrudes upwards from its front face and that forms a maneuvring lever making it easier to slide the arm 70 in its through-passage.

Thus, the tabs 71 of the arms 70 make it possible to move the pads 80 closer to or further away from one another, depending on whether the ophthalmic lens to be accepted has or does not have a large diameter.

Provision is then made for stopping means, in order to prevent the arms from sliding from their through-passages. These stopping means are arranged such that the tips 81 of the pads 80 may be positioned coincident with circumscribed circles having diameters comprised between 15 and 45 millimeters.

The stopping means are formed, on the one hand, by the tabs 71, and on the other hand, by teeth 72 that protrude upwards from the front faces of the arms 70, about halfway along these arms.

In this variant, the holder 51 comprises three through-apertures 75 in each of its arms 70, having axes that are parallel and substantially orthogonal to the plane coincident with the tips 81 of the pads 80.

The through-apertures 75 provided in each arm 70 are regularly spaced pairwise along the axis A2, and located between the pads 80 and the teeth 72.

Lastly, it may be seen in FIG. 5 that here the central aperture 102 provided in the workstation 101 has an inclined edge that has a cone shape corresponding to the shape of the outer edge 15 of the annular base 11 of the holder 1. These corresponding shapes thus play a part in guiding the holder 1 rotationally relative to the bearing platen 105 about the axis A3.

The present invention is in no way limited to the embodiments described and shown, and those skilled in the art will be able to make modifications thereto without departing from the scope of the invention.

In particular it could be applied to a centering apparatus without a blocking means.

It could also be applied to a holder equipped with other means for retaining it on the bearing plate, different from those shown in the figures. These retaining means could for example be clip fastening means, adhesive bonding means, screw fastening means, etc.

The invention claimed is:

1. An ophthalmic lens holder for a centering device, comprising:
a stand; and
at least three pads that rise up from the stand in order to present substantially coplanar free ends via which the pads are designed to bear the ophthalmic lens,
wherein the holder has the least three through-apertures having axes substantially orthogonal to the plane of the free ends of the three pads, which through-apertures emerge freely onto the front and back of the holder in order to be locatable by the centering device.

2. The holder as claimed in claim 1, in which the stand comprises three arms that are connected to one another via a base and that each bear one of said pads.

3. The holder as claimed in claim 2, in which said through-apertures are distributed over at least two of the three arms.

4. The holder as claimed in claim 2, in which at least one through-aperture is provided in each arm.

5. The holder as claimed in claim 2, in which the three arms are fixed relative to the base.

6. The holder as claimed in claim 2, in which at least one of the three arms is mounted so as to be able to move translatably on the base, along an axis parallel to the plane of the free ends of the three pads.

7. A device for centering an ophthalmic lens, comprising:
a platen accepting a holder according to claim 1;
illuminating means that are able to illuminate the ophthalmic lens borne by the holder;
acquiring means that are able to acquire an image of the ophthalmic lens borne by the holder; and
processing means that are able to deduce from the image acquired by the acquiring means, on the one hand, the position of the ophthalmic lens, and on the other hand, the position of the through-apertures in the holder.

8. The centering device as claimed in claim 7, in which the illuminating means and the acquiring means are located on the same side of the holder, and in which a reflector is provided on the other side of the support.

9. The centering device as claimed in claim 7, in which the platen has, recessed into its front face, an annular groove, and in which the stand of the holder comprises an annular base engaged in said annular groove in such a way that the holder is able to rotate on the platen about an axis parallel to the axes of the through-apertures.

10. A method for calibrating a centering device as claimed in claim 7, in which provision is made for:
a prior step of acquiring an initial position of the holder;
a step of acquiring an image of the empty holder;
a step of processing images in order to locate the positions of the through-apertures in the holder in the acquired image and in order to deduce therefrom a current position of the holder;
a step of comparing the initial position and the current position of the holder; and
a step of deducing, depending on the result of this comparison, a drift coefficient relating to variations in the shapes and positions of the components of the centering device.

* * * * *